Patented May 30, 1944

2,350,319

UNITED STATES PATENT OFFICE 2,350,319

OPERATION CHECK FOR MOLDING MACHINES

William Strauss, Philadelphia, Pa., assignor to F. J. Stokes Machine Company, a corporation of Pennsylvania Original application December 22, 1938, Serial No. 247,215. Divided and this application June 24, 1941, Serial No. 399,523

6 Claims. (Cl. 192—125)

This invention relates to plastic-molding machines and, more particularly, to an automatic machine for the molding of finished articles from pulverulent compounds such as, for example, Bakelite molding compound, a phenolic condensation product which hardens into the shape of the mold through the application of heat and pressure.

One purpose of this invention is to provide modifications and improvements of the automatic molding machine described in the application of Victor I. Zelov and William Strauss, Serial #146,550, now Patent No. 2,242,189. In particular, the present invention relates to improvements in the operation check for controlling the automatic operation of the molding press from one cycle to another in response to a molded article ejected from the machine during each cycle.

This application is a division of my co-pending application, Serial No. 247,215, filed December 22, 1938. The claims in my earlier filed application are directed to the novel arrangement for unscrewing threaded molded articles from threaded mold parts, while the claims herein are directed to the improved operation check for controlling the continued operation of the molding press from one cycle to another.

Referring to the drawings.

Figure 1:
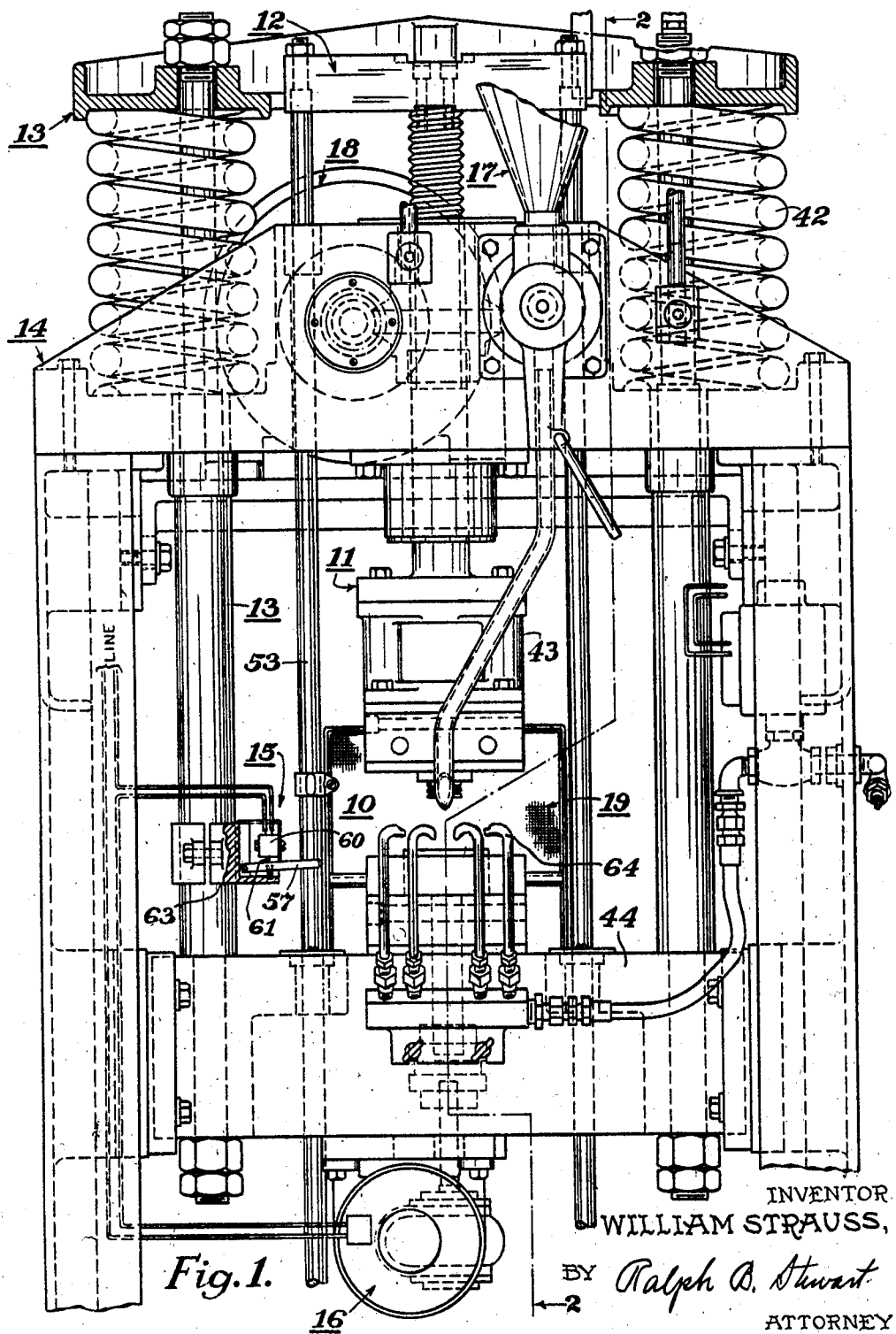
Fig. 1 is a front elevation partly in section, showing so much of a machine suitable for my purpose as is necessary to embodying the improvements.
Figure 2:
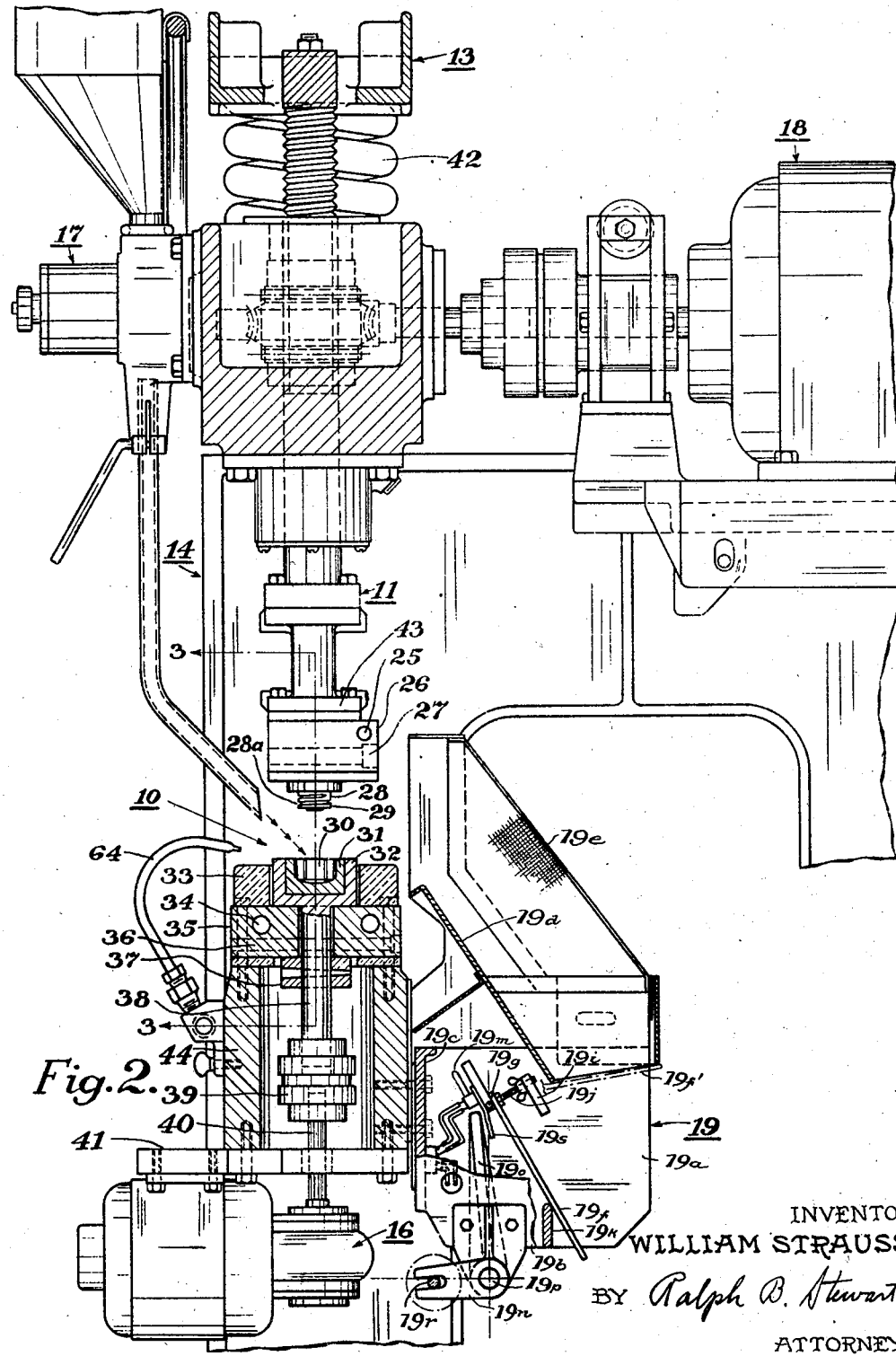
Fig. 2 is a sectional view taken on line 2—2 of Fig. 1 and showing the details of the operation check.

In the drawings there is shown a machine similar to one shown and described in the application of Victor I. Zelov and William Strauss, Serial #146,550, filed June 5, 1937, now Patent No. 2,242,189. This machine was selected and used only for the purpose of showing the principles of application and mode of operation of my invention. There is shown at 10 (Figs. 1 and 2) a mold suitable for the production of screw caps from plastic material such as phenolics, ureas, cellulose acetate, methyl methacrylate, etc., of which there now is available a large variety, the mold 10 when open as shown in Fig. 2, being supplied by the feed device 17, with a sufficient quantity of any one of these materials and then allowed to close as shown in Fig. 3, where the required pressure and heat is applied a sufficient length of time to effect the molding and curing.

The mold is of a conventional type and comprises a die 31, provided with a suitable cavity 30, mounted in a holder 32, resting on the lower platen 35 and a punch 28, attached to the upper platen 26. The upper platen 26 is provided with heating means 27 and a temperature control 25 and is mounted on the ram 11. The lower platen 35 is provided with heating means 34 and temperature control 36 and is attached to crosshead 44 of the pressure frame 13. Die holder 32 has a stem or spindle 38 extending down through lower platen 35 and connected to shaft 40 of motor 16 by the coupling 39.

In general, the machine consists of a frame 14, supporting a ram 11 with its operating mechanism connected to the reversing motor 18, which is controlled through suitable reversing switches from a controller so as to close or open the mold. On the frame 14 is also mounted a pressure frame 13 with its crosshead 44 and provisions 42 in the form of springs for producing the pressure required to be exerted on the molding compound while curing. Within frame 13 is mounted another frame 12, rigidly connected to the ram 11, and therefore only acting and moving in conjunction with ram 11. This frame 12 provides the means for operating the molding powder measuring and feeding device 17 in timed relation with the movement of the ram 11.

Any suitable master controller may be employed for the purpose of putting the machine through its paces of opening the mold, ejecting and discharging the molded piece, cleaning the mold, measuring and feeding the measured charge to the mold cavity, closing the mold, cleaning the face of the die around the punch and holding the mold closed under pressure the required length of time. With many pieces an additional step, that of breathing or degasing, must be introduced at a certain time in the curing period and this is taken care of by the proper setting of a set of dogs on the controller, so that the mold after a suitable time, will be opened for the required length of breathing time and then closed again for the curing period. The details of the controller and control circuits are not shown herein since they are conventional devices, but suitable devices for this purpose are disclosed in Zelov et al. Patent 2,242,189 and in my application Ser. No. 247,215. The extreme limit for the movement of the ram 11, is controlled by a pair of limit switches, one of which acts to stop the motor when the ram has reached its topmost point of travel and the other acts to stop the motor on its downward stroke when the proper pressure is applied to the mold and the lower crosshead 44 has been depressed so as to dwell under the required tension from springs 42.

An operating check 19 is used for the purpose of controlling the continuity of operation. Every molded piece when discharged must pass through the operation check and by means of interlocking switches keep the machine in continuous operation as long as pieces are discharged, but in case of failure to discharge a molded piece, the operation check functions to stop the machine before any damage can be done.

The operation check 19 is preferably formed as a unitary device mounted on the opposite side of the die 31 from the air jet 64. The operation check consists of a main frame having two parallel side walls 19a and 19b and a back wall 19c secured to the back face of cross-head 44 by suitable screws or other fastening devices. Supported upon the frame 19a—19b—19c is an inclined chute having a bottom wall 19d, a top wall 19e, and suitable side walls, the upper open end of the chute being arranged adjacent the die 31 and in position to receive the molded article as it is blown from the press by the air jet 64. The lower end of the chute is positioned between the side walls 19a and 19b of the frame, and is normally closed by a plate 19f which is pivotally supported on the horizontal axis 19g. The plate 19f is shown in its tripped position in Figure 2, but the normal position for the plate is shown in dotted lines at 19f'. A suitable counter-weight 19h is provided to normally urge the plate 19f against the lower end of the chute when in its normal position 19f'. A second counter-weight 19i is adjustably mounted upon a threaded screw 19j mounted upon the plate 19f and extending at right angles thereto. The purpose of the second counter-weight 19i is to urge the plate 19f into contact with a fixed stop 19k (extending across the space between walls 19a and 19b at the lower edge of these walls) and to hold the plate in contact with this stop after the molded article has been discharged from the plate. A mercury switch 19m is suitably mounted upon the tilting plate 19f and is normally open when the plate is in its normal position 19f' but is closed when the plate is moved to its tripped position shown in Figure 2. This switch is suitably connected to continue the operation of the main controller through another cycle each time a molded article is discharged and operates the plate to its tripped position. Since the plate 19f will remain in its tripped position due to the action of counter-weight 19i, it is necessary to provide means for resetting the plate to its normal position. Such means is shown in the form of a bell crank lever having two arms 19n and 19o mounted on opposite ends of a shaft 19p which is suitably journalled in a bearing carried by a frame wall 19b. The bell crank 19n—19o is normally maintained in the position shown in Figure 2 but is rotated in a clockwise direction by means of a pin 19r engaging a slot formed in the end of arm 19n, the pin 19r being mounted upon some part of the press which has relative upward movement with respect to the trap 19 an article has been discharged into the trap. For example, the pin 19r may be mounted on the main frame 14 so that when cross-head 44 is pressed down by the ram, the downward movement of the trap causes the bell crank to rotate in a clockwise direction. In rotating from its normal position, the arm 19o engages a member 19s secured to the plate 19f and causes the plate 19f to rotate in a counter-clockwise direction into its normal position shown at 19f'. When cross-head 44 returns to its normal position, the bell crank lever 19n—19o is returned to its normal position shown in Figure 2. As shown in the drawings, the upper wall 19e of the chute and preferably part of the side walls of the chute are formed of wire netting which will deflect the discharged article downwardly along the chute but will allow the air blast from the air jet 64 to pass through the wall 19e, thus avoiding undue air pressure on the upper face of plate 19f which might result in false operation of the operation check.

The punch 28 is provided with threads on the outer surface thereof for forming internal threads on the screw cap to be molded in the die 31, and in order to remove the cap from the punch 28, the die 31 is mounted for rotation by the motor 16 as explained above. The die should remain stationary while the article is being formed, but it is rotated while the press is being opened, and the rate of rotation is related to the rate of opening the press so that the threaded cap is unscrewed completely from the punch 28 before it is freed from the die 31. For the purpose of controlling the motor 16, I provide a sensitive switch controlled by operation of the press to start and stop the motor at the proper time.

The switching arrangement comprises the switch unit 15, mounted in any convenient way, for example, to frame 13, so that it will not be affected by the relative variation which exists with varying pressures on the mold. Any kind of quick acting make and break switch may be used, as for example 60, shown mounted within the housing 63, with terminal connections 58 and 59, so as to make or break the circuit connected to motor 16. Because of the long movement required where the motor must remain stationary, I have provided a lever 57, mounted within the housing 63 and urged by the spring 62 against the switch button 61. Assuming that normally when the mold is open we desire the rotation to take place, then a normally open switch might be used so that in the position shown, Fig. 1, the circuit would be closed and the motor rotating the mold member. In order to stop the motor at the desired period in the cycle, a switch finger is attached to side rod 53 of frame 12 and placed at such a point or distance from lever 57 that it will break the circuit at the desired time and hold it open until returned to that same position. From previous descriptions it is understood that frame 12 is actuated or moved by the ram itself and therefore switch finger 54 will move in unison with the punch member of the mold. As no two molds are exactly alike or no two molded pieces are exactly the same dimensions, the position of both the units 15 and switch finger 54 is made adjustable and can be set to perform the unscrewing operation at the desired time in the cycle. The amount of lost motion between the lever 57 and the contact point 61 of the switch can be varied to suit the need of the particular mold and molded piece being made.

In molding an article the cycle of operation of my machine might be as follows: With the mold open as shown in Figs. 1 and 2, and ram 11 starting on its down stroke to close the mold, a charge of material already measured out will be delivered to the cavity 30 by the measuring and feeding device 17. As soon as the molding compound is delivered into the mold cavity it commenses to heat up from the temperature at which the die 31 is kept and as the punch 28 (also at the desired temperature) enters the mold cavity 30, it compresses the molding compound within the cavity against the springs 42, reducing the powder to a plastic state, gradually forcing some of this plastic mass out over the brim of the cavity until the mold is completely closed. The controller and timer hold the mold closed for the predetermined time during which time the molding compound is formed into the proper shape and cured sufficiently so that it will retain its shape and resist distortion when ejected. At this point in the cycle the motor 18 is started through the action of controller and retracts ram 11 and with it the ram frame 12 and punch 28.

As the frame 12 retracts, together with the ram and punch, it permits spring 62 to cause lever 57 to contact the switch button 61, establishing a current supply to motor 16 which immediately will start to rotate the die holder 32 and the combined action of the retracting ram and the rotating die unscrews the molded piece. Through the action of the controller, the unscrewed molded piece is blown off the surface of the die 31 as soon as freed from punch 28, the air jets 64 being operated at the proper time by the controller, discharging the molded piece into operation check 19, and thus insuring continuity of operation. The molded piece having been delivered to the operation check 19, the ram will commence to close the mold again causing a measured charge of material to be delivered into the cavity 30. Influenced by the movement of ram 11 and frame 12, the switch 15 is opened at the proper point and the rotation of the die stopped.

When the plate 19f of the operation check is moved downwardly to the tripped position shown in Fig. 2, it remains in this position until the next downward stroke of the ram 11 when the cross-head 44 is moved downwardly by the ram against the pressure of springs 42, and the downward movement of the operation check, which is carried by cross-head 44, causes operation of bell crank 19n—19o to reset the plate 19f in its normal position 19f'. The arrangement for biasing the plate 19f in its tripped or tilted position guards against the possibility of the plate returning to its horizontal position and opening switch 19m before the main controller has fully started on another cycle.

What I claim is:

1. A device for controlling the operation of a molding press wherein a molded article is discharged from the press at the end of each molding cycle, said device comprising a chute for receiving said discharged article, a tiltable barrier normally biased to a position across the path of travel of said article in said chute and being tiltable by said article in its passage through said chute, control means operated by the tilting of said barrier for controlling the operation of said press, means for biasing said barrier in its tilted position independently of the discharged article, and means operated in timed relation with the operation of said press for returning said barrier to its normal position across the said chute.

2. An article controlled device comprising a chute for receiving said article, a tiltable barrier normally positioned across the path of travel of said article in said chute and being tiltable by said article in its passage through said chute, biasing means for retaining said barrier in its tilted position independently of said article, and means controlled by said barrier in its tilted position for returning said barrier to its normal position against the action of said biasing means.

3. A device for controlling the operation of a molding press wherein a molded article is discharged from the press at the end of each molding cycle, said device comprising an inclined chute for receiving said discharged article, a pivotally mounted weighing plate positioned across the lower end of said inclined chute in a substantially horizontal position, and being tiltable under the weight of said article to an inclined position where the article slides from said plate by gravity, means for gravity biasing said plate against the lower end of said chute when in its normal position and for gravity biasing said plate in the opposite direction against a fixed stop when in said inclined position, means controlled by the tilting of said plate from its horizontal position for continuing the operation of said press, and means controlled in timed relation with the continued operation of said press for returning said plate to its normal position across the lower end of said chute.

4. A device for controlling the operation of a molding press wherein a molded article is discharged from the press at the end of each molding cycle, said device comprising an inclined chute for receiving said discharged article, a pivotally mounted plate positioned across the lower end of said inclined chute in a substantially horizontal position, and being tiltable under the weight of said article to a position where the article slides from said plate by gravity, a counterweight secured to said plate and being effective to hold said plate in its normal position across the lower end of said chute, and a second counter-weight secured to said plate and being effective in the tilted position of said plate to urge said plate against a fixed stop and to maintain said plate in tilted position after said article has been discharged from said plate, means controlled by the tilting of said plate from its horizontal position for continuing the operation of said press, and means controlled in timed relation with the continued operation of said press for returning said plate to its normal position across the lower end of said chute .

5. A device for controlling the operation of a molding press wherein a molded article is discharged from the press at the end of each molding cycle, said device comprising a pivotally mounted weighing plate normally positioned in a substantially horizontal position for receiving said articles thereon, and being tiltable under the weight of said article to an inclined position where the article slides from said plate by gravity, and gravity biasing means acting on said plate independently of said article for urging said plate in one direction when in its normal position and for urging said plate in the opposite direction against a fixed stop when in said inclined position.

6. A device for controlling the operation of a molding press wherein a molded article is discharged from the press at the end of each molding cycle, said device comprising a pivotally mounted weighing plate normally positioned in a substantially horizontal position for receiving said articles thereon, and biasing means for normally maintaining said plate in its horizontal position but permitting tilting of said plate under the weight of an article into a position where the article slides therefrom by gravity, said biasing means being effective to maintain said plate in its tilted position after the article has been discharged therefrom.

WILLIAM STRAUSS.

CERTIFICATE OF CORRECTION.

Patent No. 2,350,319. May 30, 1944.

WILLIAM STRAUSS.

It is hereby certified that error appears in the printed specification of the above numbered patent requiring correction as follows: Page 2, first column, line 57, before the word "an" insert --after--; and that the said Letters Patent should be read with this correction therein that the same may conform to the record of the case in the Patent Office.

Signed and sealed this 22nd day of August, A. D. 1944.

(Seal)

Leslie Frazer

Acting Commissioner of Patents.